(12) United States Patent
Zhou et al.

(10) Patent No.: US 11,787,375 B2
(45) Date of Patent: Oct. 17, 2023

(54) INSTALLATION TOOL

(71) Applicant: Bendix Commercial Vehicle Systems LLC, Elyria, OH (US)

(72) Inventors: Nianqing Zhou, Avon, OH (US); Daniel P Zula, North Ridgeville, OH (US); Shu Yan Liu, Calgary (CA)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 310 days.

(21) Appl. No.: 17/341,766

(22) Filed: Jun. 8, 2021

(65) Prior Publication Data
US 2022/0388486 A1 Dec. 8, 2022

(51) Int. Cl.
*B60T 8/32* (2006.01)
*G01P 1/02* (2006.01)

(52) U.S. Cl.
CPC .............. *B60T 8/329* (2013.01); *G01P 1/026* (2013.01)

(58) Field of Classification Search
CPC ................................ B60T 8/329; G01P 1/026
USPC .......................................................... 73/493
See application file for complete search history.

(56) References Cited

U.S. PATENT DOCUMENTS

| 4,000,668 | A | | 1/1977 | Keasler | |
|---|---|---|---|---|---|
| 4,171,565 | A | * | 10/1979 | Boudreau | H01R 43/22 29/739 |
| 4,289,010 | A | | 9/1981 | Badger | |
| 4,604,889 | A | | 8/1986 | Sukharevsky | |
| 4,807,498 | A | | 2/1989 | Kleiser et al. | |
| 4,836,062 | A | | 6/1989 | Latorre | |
| 5,595,220 | A | | 1/1997 | Leban et al. | |
| 5,770,809 | A | * | 6/1998 | Waterman | G01N 17/046 73/866.5 |
| 8,623,254 | B2 | * | 1/2014 | Goetz | G01R 33/02 264/294 |
| 2005/0034546 | A1 | * | 2/2005 | Fenkanyn | B25B 27/04 73/146 |
| 2010/0207295 | A1 | * | 8/2010 | Goetz | B29C 45/1671 425/123 |

* cited by examiner

*Primary Examiner* — Nathaniel T Woodward
(74) *Attorney, Agent, or Firm* — Brian E. Kondas; Cheryl L. Greenly; Eugene E. Clair

(57) ABSTRACT

An installation system for an associated housing includes a sensor and a tool. The sensor includes: a barrel portion, a sensing end of the barrel portion, a non-sensing end of the barrel portion, an over-mold portion at the non-sensing end, and a wire extending from the non-sensing end. The tool includes a handle and an applicator secured to the handle. The applicator includes a first applicator portion, a second applicator portion, and a channel. When the over-mold portion of the sensor is proximate to a channel opening and the channel opening is blindly inserted into the associated housing opening, a force applied to the handle along an angle relative to the longitudinal axis of the handle frictionally seats the sensor in the associated housing.

21 Claims, 3 Drawing Sheets

INSTALLATION TOOL

BACKGROUND

The present invention relates to positioning a sensor in a bore. It finds particular application in conjunction with blindly inserting a sensor in a bore and will be described with particular reference thereto. It will be appreciated, however, that the invention is also amenable to other applications.

Conventionally, properly positioning a wheel speed sensor (WSS) for sensing wheel speed has involved inserting the WSS into a housing that is mounted externally on a drum of a drum brake. The external mounting of the housing makes it relatively easily accessible and in plain view when inserting the WSS into the housing. Therefore, a person securing the WSS in the conventional housing can insert the WSS while relatively easily applying a uniform force to the back end and along a longitudinal axis of the WSS as the front end (e.g., sensing end) of the WSS is inserted into the bore. The WSS encounters frictional resistance as the WSS is inserted into the bore and is frictionally seated in the bore. Therefore, applying a uniform force to the back end of the WSS is desirable for ensuring the WSS is fully inserted into the bore while not being damaged.

Unlike a drum brake, an air disc brake (ADB) typically does not include an external housing for a WSS. Instead, a mounting block is press-fit into an axle flange and torque plate of the ADB. In such designs, the mounting block appears countersunk in the axle flange and torque plate. The WSS sensor is then frictionally inserted through the axle flange and torque plate before being frictionally secured in the mounting block. Universal WSS's, which have a shorter sensor barrel length than straight/axial WSS's, typically do not have a long enough barrel so that the WSS can be seated in the countersunk mounting block before a rear end of the universal WSS is inserted beyond the axle flange and/or torque plate. Furthermore, since the WSS is inserted through the axle flange and wheel hub, a bore of the countersunk mounting block is not visible to a person inserting the WSS. Therefore, positioning a WSS into the countersunk mounting block is referred to a "blind" insert of the WSS into the mounting block. Such blind installations of a WSS make it difficult to apply a uniform force to the back end of the WSS as the front end (sensing end) is inserted into the bore of the mounting block. In addition, the countersunk bore makes it difficult to fully insert the WSS so that the front end is properly positioned near an associated tone ring.

The present invention provides a new and improved apparatus and method which addresses the above-referenced problems.

SUMMARY

In one embodiment, an installation system for an associated housing includes a sensor and a tool. The sensor includes: a barrel portion, a sensing end of the barrel portion, a non-sensing end of the barrel portion, an over-mold portion at the non-sensing end, and a wire extending from the non-sensing end. The tool includes a handle and an applicator secured to the handle. The applicator includes a first applicator portion, a second applicator portion, and a channel. When the over-mold portion of the sensor is proximate to a channel opening and the channel opening is blindly inserted into the associated housing opening, a force applied to the handle along an angle relative to the longitudinal axis of the handle frictionally seats the sensor in the associated housing.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
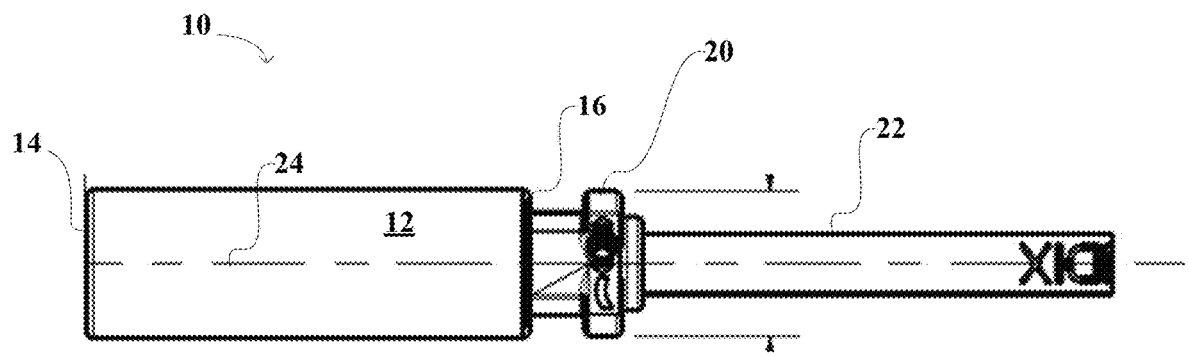
FIG. 1 illustrates a schematic representation of a sensor in accordance with one embodiment of the present invention.

With reference to FIG. 1, a sensor 10 includes a barrel portion 12, having a first end 14 (e.g., a sensing end) and a second end 16 (e.g., a non-sensing end). An over-molding portion 20 is positioned at the non-sensing end 16. An electrical conductor 22 (e.g., a wire or a wire harness) extends from the over-molding portion 20 and is electrically connected to electronic components (not shown) inside the sensor 10. A sensor axis 24 is defined between the first and second ends 14, 16, respectively. In the illustrated embodiment, the sensor 10 is a wheel speed sensor having an outside diameter of the barrel portion 12 larger than an outside diameter of the over-mold portion 20. In one embodiment, the sensor 10 is a universal wheel speed sensor having a length of about 47.63 mm between the first and second ends 14, 16, respectively. However, any type of wheel sensor 10 is contemplated. Although a wheel speed sensor is illustrated, any other type of sensor is also contemplated.

Figure 2:
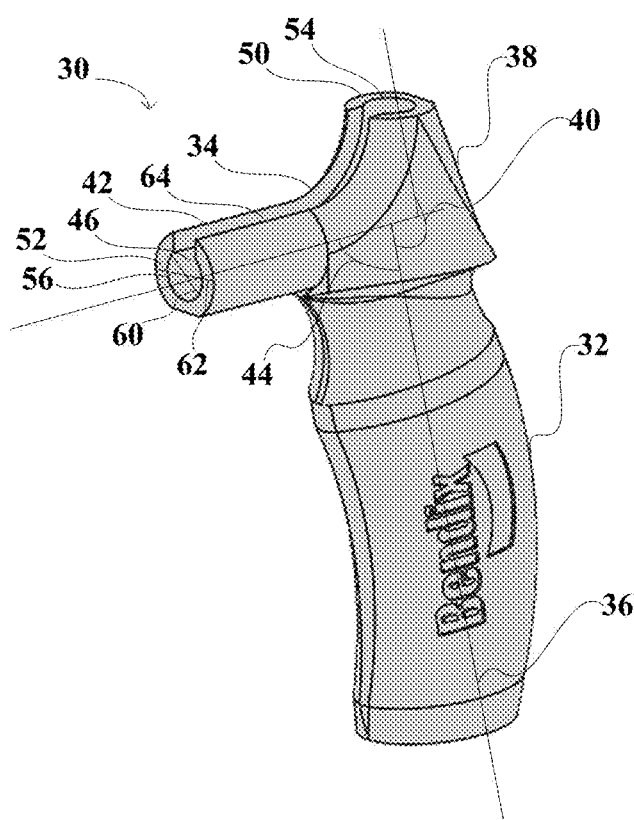
FIG. 2 illustrates a schematic representation of a tool in accordance with one embodiment of the present invention.

With reference to FIG. 2, a tool 30 includes a handle 32 and an applicator 34 secured to the handle 32. In the illustrated embodiment, the applicator 34 is secured to a top portion of the handle 32. A longitudinal axis 36 is defined by the handle 32.

The applicator 34 includes a first portion 38 (e.g., a wire portion) extending away from the handle 32 at a first angle 40 (e.g. a wire angle) relative to the longitudinal axis 36 of the handle 32. As illustrated, the applicator 34 is secured to a top portion of the handle 32. In one embodiment, the first angle 40 is greater than 90° and, in one example, is about 180°. The applicator 34 also includes a second portion 42 (e.g., a sensor portion) extending away from the handle 32 at a second angle 44 (e.g., a sensor angle) relative to the longitudinal axis 36 of the handle 32. In one embodiment, the second angle 44 is greater than 90°. In the illustrated embodiment, the first applicator portion 38 and the second applicator portion 42 extend away from the handle 32 at an angle of about 90° from each other.

A channel 46 extends from a first applicator end 50 (e.g., a wire end) of the first applicator portion 38 to a second applicator end 52 (e.g., a sensor end) of the second applicator portion 42. The channel 46 is sized to accommodate the wire 22. A first channel opening 54, at the first applicator end 50, is sized to accommodate the wire 22. A second channel opening 56, at the second applicator end 52, has an inner diameter 60, sized to accommodate the wire 22, and an outer diameter 62. In one embodiment, the inner diameter 60 is about 0.44" and the outer diameter 62 is about 0.74" A gap 64 runs along a length of the channel 46 from the first channel opening 54 to the second channel opening 56 and is sized to pass the wire 22 into and out of the channel 46.

Figure 3:
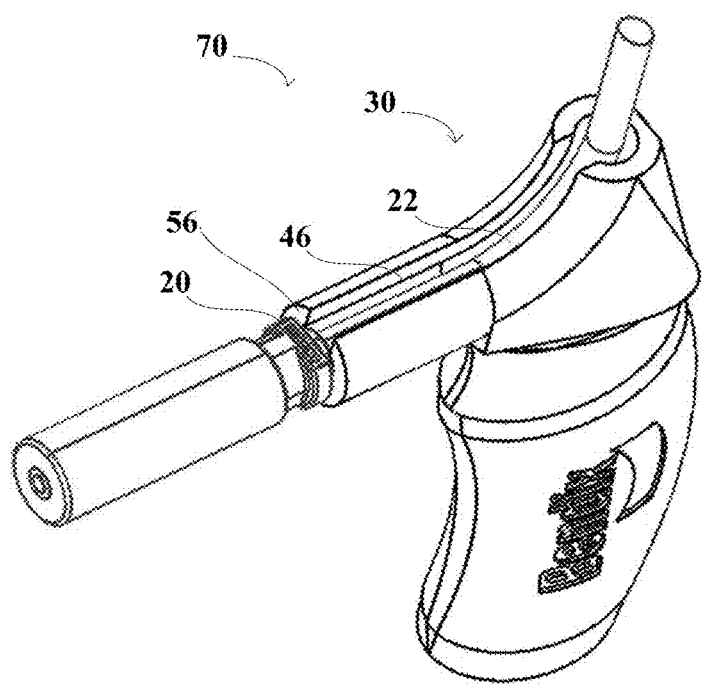
FIG. 3 illustrates a schematic representation of an installation system in accordance with one embodiment of the present invention.

With reference to FIG. 3, an installation system 70 includes the tool 30 and the sensor 10. In one example, a face of the over-mold portion 20 contacts a face of the second channel opening 56. In addition, the wire 22 is illustrated in the channel 46. A person using the installation system 70 may pull on the wire 22 to maintain the face of the over-mold portion 20 in contact with the face of the second channel opening 56.

Figure 4:
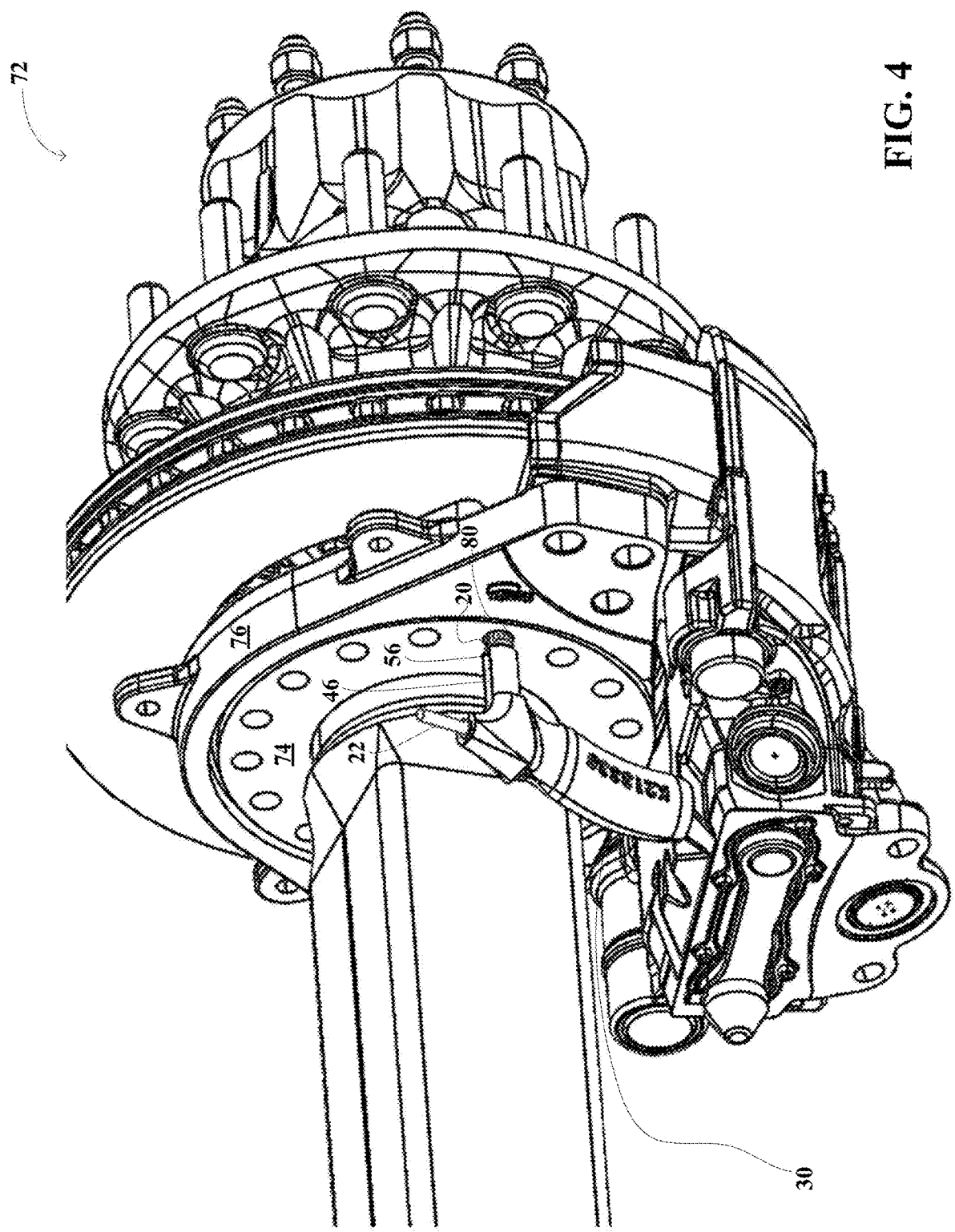
FIG. 4 illustrates a schematic representation of the installation system used with an associated housing in accordance with one embodiment of the present invention.

With reference to FIG. 4, the tool 30 is illustrated with the over-mold portion 20 contacting a face of the second channel opening 56, while the first end (sensing end) of the sensor (not shown in FIG. 4) is inserted into the second channel opening 56. The wire 22 is inserted in the channel 46. A housing 72 is illustrated as an air disc brake (ADB) housing. However, it is to be understood that any other type of housing is also contemplated. In the illustrated embodiment, the housing 72 includes an axle flange 74 and a torque plate 76. The axle flange 74 includes an axle flange housing opening 80, and the torque plate 76 includes a plate housing opening 82 (see FIG. 5). The outer diameter 62 is sized to be accommodated in the axle flange opening 80 and the torque plate opening 82.

Figure 5:
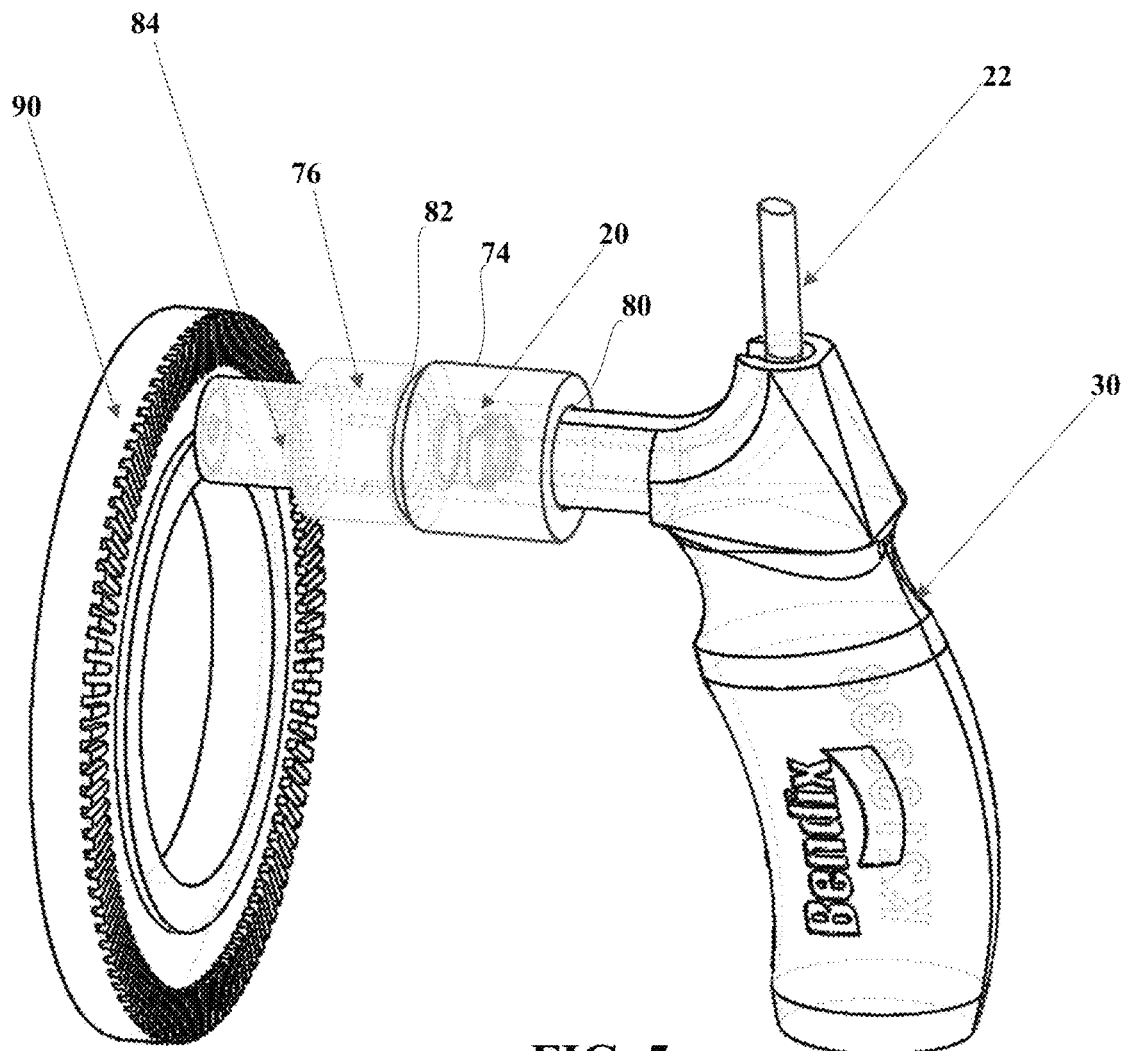
FIG. 5 illustrates a schematic representation of the installation system used with a partial view of the associated housing in accordance with one embodiment of the present invention.

With reference to FIG. 5, the installation system 70 (e.g., the tool 30 and the sensor 10) is illustrated along with a mounting block 84 frictionally secured in the axle flange opening 80 and/or the plate housing opening 82. The second (sensor) portion 42 of the applicator 34 is inserted through the axle flange opening 80 of the axle flange 74 (only partially illustrated in FIG. 5), the mounting block 84 and into the plate housing opening 82 of the torque plate 76 (only partially illustrated in FIG. 5). The sensing end 14 of the sensor 10 is positioned to magnetically engage with an associated tone ring 90. In other words, the sensor 10, including the sensing end 14, does not actually physically touch the tone ring 90; instead, a magnetic interaction between the sensor 10 (e.g., the sensing end 14) and the tone ring 90 changes a magnetic field around the sensor 10 (e.g., the sensing end 14) as the tone ring 90 rotates with respect to the sensor 10 (e.g., the sensing end 14). In this manner, the sensor 10 (e.g., the sensing end 14) senses the movement of the tone ring 90 as the tone ring 90 rotates with respect to the sensor 10 (e.g., the sensing end 14) (e.g., relative movement of the tone ring 90 with respect to the sensor 10 (e.g., the sensing end 14)).

In the embodiment illustrated in FIG. 5, at least a portion of the axle flange opening 80 is countersunk with regard to the plate housing opening 82 and the mounting block 84. The outer diameter 62 is sized to be accommodated in the countersunk portion of the axle flange opening 80, the axle flange opening 80, the mounting block 84 and the plate housing opening 82.

During use, the installation system 70 is prepared by inserting the wire 22 in the channel 46. A person performing the installation holds the wire 22 to keep the face of the over-mold portion 20 in contact with the face of the second channel opening 56. The user then inserts the sensing end 14 of the sensor 10 and the second applicator end 52 into the axle flange opening 80, the mounting block 84 and the plate housing opening 82 along the sensor axis 24, which at this time is coincident to the sensor angle 44, to frictionally secure the sensor 10 in the axle flange opening 80, the mounting block 84 and the plate housing opening 82 until the sensing end 14 of the sensor 10 is positioned to magnetically engage with the tone ring 90. The person the removes wire 22 in the channel 46 and removes the tool 30 from the axle flange opening 80 and the plate housing opening 82.

The sensor angle 44 provide an ergonomic advantage when a force is applied to the handle 32 while inserting the second applicator end 52 into the axle flange opening 80, the mounting block 84 and the plate housing opening 82 along the sensor axis 24.

In addition, the sensor 10 and the second applicator end 52 are at least partially out of view (e.g., hidden in the axle flange 74 and the torque plate 76) from the person performing the installation and, therefore, is referred to as a blind installation. Therefore, the ergonomic advantage described above facilitates keeping the insertion of the sensor 10 along the sensor axis 24 during the blind installation. Maintaining the sensor 10 along the sensor axis 24 during installation reduces the chance of inserting the sensor 10 along an axis other than the sensor axis 24, which can result in damage to the sensor 10.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An installation system for an associated housing, the system comprising:
    a sensor, including:
        a barrel portion;
        a sensing end of the barrel portion;
        a non-sensing end of the barrel portion;
        an over-mold portion at the non-sensing end; and
        a wire extending from the non-sensing end;
    a tool, including:
        a handle;
        an applicator secured to the handle, the applicator including:
            a first applicator portion extending away from the handle at a first angle relative to a longitudinal axis of the handle;
            a second applicator portion extending away from the handle at a second angle relative to the longitudinal axis of the handle;
            a channel extending from a first applicator end of the first applicator portion to a second applicator end of the second applicator portion, the channel sized to accommodate the wire;
            a first channel opening, at the first applicator end, sized to accommodate the wire;

a second channel opening, at the second applicator end, having an inner diameter sized to accommodate the wire, and an outer diameter sized to be accommodated in an opening of the associated housing; and a gap, along a length of the channel from the first channel opening to the second channel opening, sized to pass the wire into the channel;

wherein when the over-mold portion of the sensor is proximate to the second channel opening and the second channel opening is blindly inserted into the associated housing opening, a force applied to the handle along the second angle relative to the longitudinal axis of the handle frictionally seats the sensor in the associated housing.

2. The installation system as set forth in claim 1, wherein:
the blind insertion of the second channel opening in the associated housing opening facilitates the sensor to be blindly seated in the associated housing along the second angle relative to the longitudinal axis of the handle.

3. The installation system as set forth in claim 1, wherein:
the outer diameter of the second channel opening is sized to be capable of being accommodated in a countersunk portion of the associated housing opening.

4. The installation system as set forth in claim 3, wherein:
the second channel opening is inserted past the countersunk portion of the associated housing opening to blindly frictionally seat the sensor in the associated housing along the second angle relative to the longitudinal axis of the handle.

5. The installation system as set forth in claim 1, wherein:
the sensor is seated in the associated housing so that the sensing end is magnetically engaged with an associated tone ring.

6. The installation system as set forth in claim 1, wherein:
a face of the over-mold portion contacts a face of the second channel opening.

7. The installation system as set forth in claim 1, wherein:
an outside diameter of the barrel portion is larger than an outside diameter of the over-mold portion.

8. The installation system as set forth in claim 1, wherein:
the second angle relative to the longitudinal axis of the handle is greater than about 90°.

9. The installation system as set forth in claim 8, wherein:
the second angle relative to the longitudinal axis of the handle provides an ergonomic advantage when force is applied to the handle along the second angle relative to the longitudinal axis.

10. The installation system as set forth in claim 1, wherein:
the inner diameter of the second channel opening is about 0.44"; and
the outer diameter of the second channel opening is about 0.74".

11. The installation system as set forth in claim 1, wherein:
the first applicator portion and the second applicator portion extend away from the handle at an angle of about 90° from each other.

12. The installation system as set forth in claim 1, wherein:
the applicator is secured to a top portion of the handle.

13. The installation system as set forth in claim 1, wherein:
the gap is sized to pass the conductor out of the channel after the sensor is frictionally seated in the associated housing.

14. The installation system as set forth in claim 1, further including:
a mounting block frictionally secured in the associated housing opening, the sensor being frictionally seated in the mounting block.

15. A method for blindly installing a sensor in a housing, the method comprising:
positioning a non-sensing end of the sensor proximate a sensor end of a channel;
positioning the sensor end of the channel in an opening of the housing;
applying force to a handle associated with the channel at a sensor angle relative to a longitudinal axis of the handle;
blindly inserting the sensor end of the channel past a countersunk portion of the housing opening until a sensing end of the sensor is frictionally seated inside the opening of the housing; and
removing the sensor end of the channel from the housing.

16. The method for blindly installing a sensor in a housing as set forth in claim 15, further including:
before inserting the sensor end of the channel past the countersunk portion of the housing, positioning a wire, associated with the sensor, in the channel.

17. The method for blindly installing a sensor in a housing as set forth in claim 16, further including:
after inserting the sensor end of the channel past the countersunk portion of the housing, removing the conductor from the channel.

18. The method for blindly installing a sensor in a housing as set forth in claim 17, wherein:
positioning the conductor includes passing the conductor through a gap in the channel; and
removing the conductor includes passing the conductor through the gap in the channel.

19. The method for blindly installing a sensor in a housing as set forth in claim 15, further including:
inserting a mounting block into the housing opening; and
inserting the sensor end of the channel past the countersunk portion of the housing opening until the sensing end of the sensor is frictionally seated inside the mounting block.

20. The method for blindly installing a sensor in a housing as set forth in claim 15, further including:
removing the sensor end of the channel from the housing while leaving the sensor frictionally seated inside the housing past the countersunk portion.

21. The method for blindly installing a sensor in a housing as set forth in claim 20, further including:
inserting the sensor end of the channel into the housing opening until the sensing end of the sensor magnetically communicates with an associated tone ring.

* * * * *